US012729006B2

(12) United States Patent
Darfeuil et al.

(10) Patent No.: US 12,729,006 B2
(45) Date of Patent: Sep. 8, 2026

(54) AIRCRAFT ELECTRIC OR HYBRID PROPULSION ARCHITECTURE

(71) Applicants: SAFRAN HELICOPTER ENGINES, Bordes (FR); UNIVERSITE DE LORRAINE, Nancy (FR); CENTRE NATIONAL DE LA RECHERCHE SCIENTIFIQUE, Paris (FR)

(72) Inventors: Pierre Alain Jean-Marie Darfeuil, Moissy-Cramayel (FR); Thomas Michel André Gérard Barraco, Mazerolles (FR); François Joseph Paul Lelong, Moissy-Cramayel (FR); Serge Lionel Pierfederici, Paris (FR); Thomas Klonowski, Moissy-Cramayel (FR)

(73) Assignees: SAFRAN HELICOPTER ENGINES, Bordes (FR); UNIVERSITE DE LORRAINE, Nancy (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 19/138,466

(22) PCT Filed: Dec. 12, 2023

(86) PCT No.: PCT/FR2023/051990

§ 371 (c)(1),
(2) Date: Jun. 12, 2025

(87) PCT Pub. No.: WO2024/126944

PCT Pub. Date: Jun. 20, 2024

(65) Prior Publication Data

US 2026/0028129 A1 Jan. 29, 2026

(30) Foreign Application Priority Data

Dec. 13, 2022 (FR) ...................................... 2213257

(51) Int. Cl.
*B64D 27/357* (2024.01)
*B64D 27/33* (2024.01)
(Continued)

(52) U.S. Cl.
CPC ........... *B64D 27/357* (2024.01); *B64D 27/33* (2024.01); *B64D 27/34* (2024.01); *H02J 1/086* (2020.01);
(Continued)

(58) Field of Classification Search
CPC ...... B64D 27/33; B64D 27/34; B64D 27/357; B64D 2221/00; H02J 1/086; H02J 2310/44
See application file for complete search history.

(56) References Cited

U.S. PATENT DOCUMENTS 7,936,086 B2 * 5/2011 Yue ......................... H02J 1/102 307/10.1
2006/0061213 A1 * 3/2006 Michalko .................. H02J 4/00 307/9.1

(Continued)

FOREIGN PATENT DOCUMENTS

FR 3095422 A1 * 10/2020 ........... B64D 27/357
FR 3095422 B1 10/2020
WO 2020044134 A1 3/2020

OTHER PUBLICATIONS

Search Report and Written Opinion issued in International Application No. PCT/FR2023/051990, mailed Mar. 6, 2024.

*Primary Examiner* — Rexford N Barnie
*Assistant Examiner* — Rasem Mourad
(74) *Attorney, Agent, or Firm* — Bookoff McAndrews, PLLC

(57) ABSTRACT

An aircraft electric or hybrid propulsion architecture including at least two propulsion lines, each propulsion line
(Continued)

including at least one electric motor supplied from at least two energy sources of the propulsion architecture through at least two energy supply paths, each energy supply path including at least one energy inverter, and one electrical protection delivering a DC voltage for a HVDC bus, each HVDC bus distributing this DC voltage to at least one electric motor through at least one energy inverter and one electrical protection, the propulsion architecture including at least partially dissimilar and preferably completely dissimilar energy supply paths.

20 Claims, 6 Drawing Sheets

(51) Int. Cl.
*B64D 27/34* (2024.01)
*H02J 1/08* (2026.01)
*H02J 105/30* (2026.01)

(52) U.S. Cl.
CPC ....... *B64D 2221/00* (2013.01); *H02J 2105/32* (2026.01)

(56) References Cited

U.S. PATENT DOCUMENTS

2015/0097422 A1* 4/2015 Toothman ................. H02J 1/12 307/9.1
2022/0021215 A1* 1/2022 Atteia ..................... H02J 3/381
2022/0094297 A1 3/2022 Lacaux et al.

* cited by examiner

[Fig. 1]
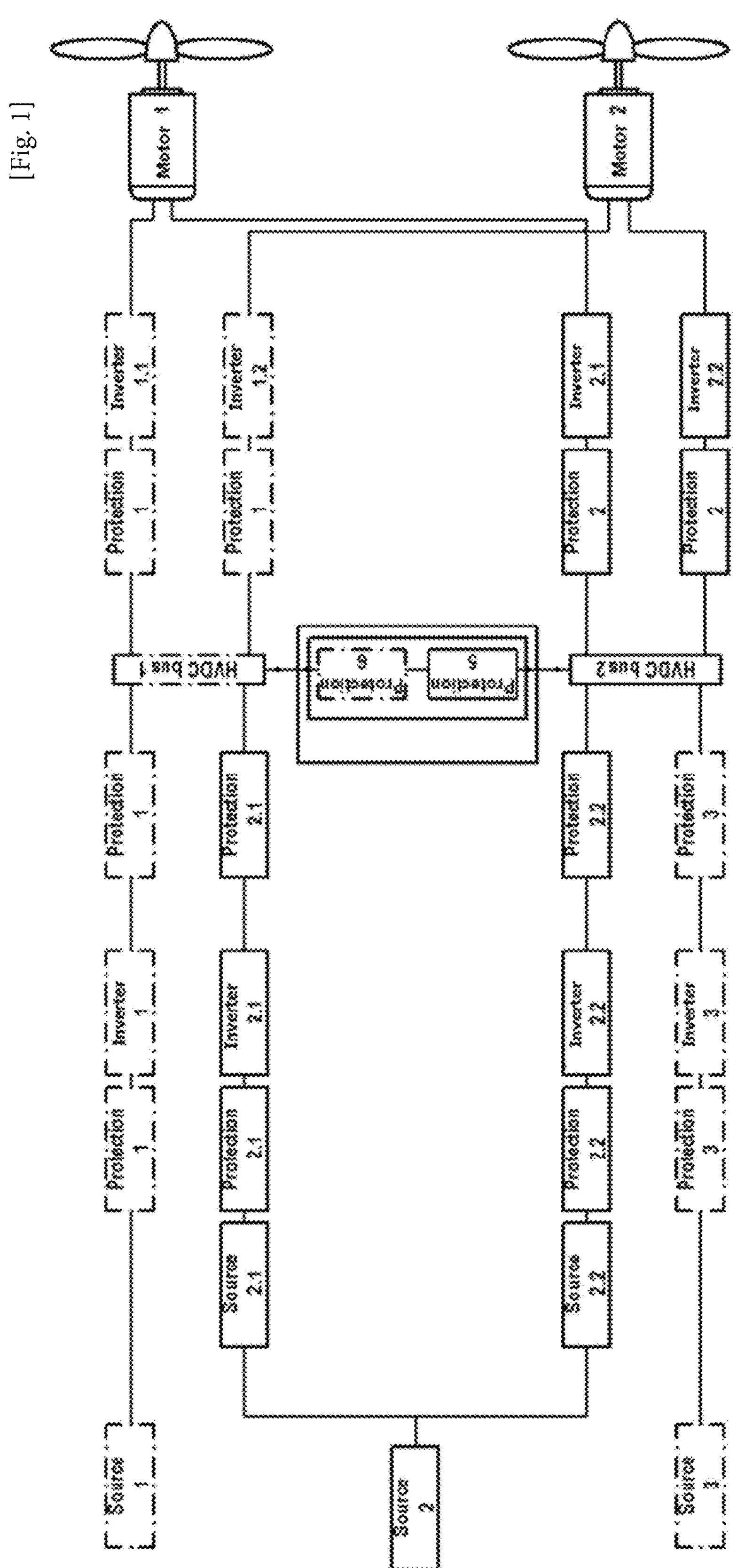

[Fig. 2]
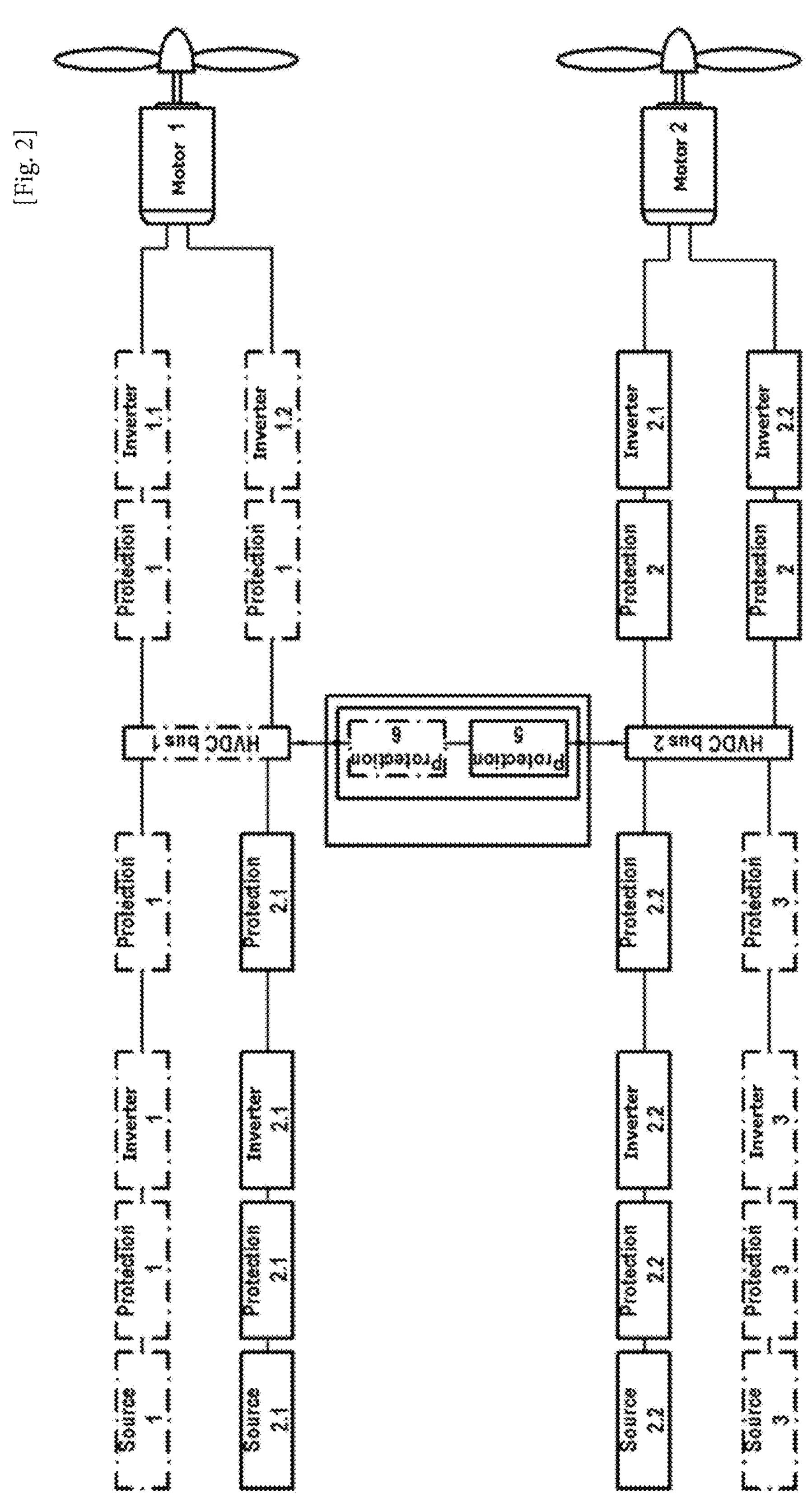

[Fig. 3]
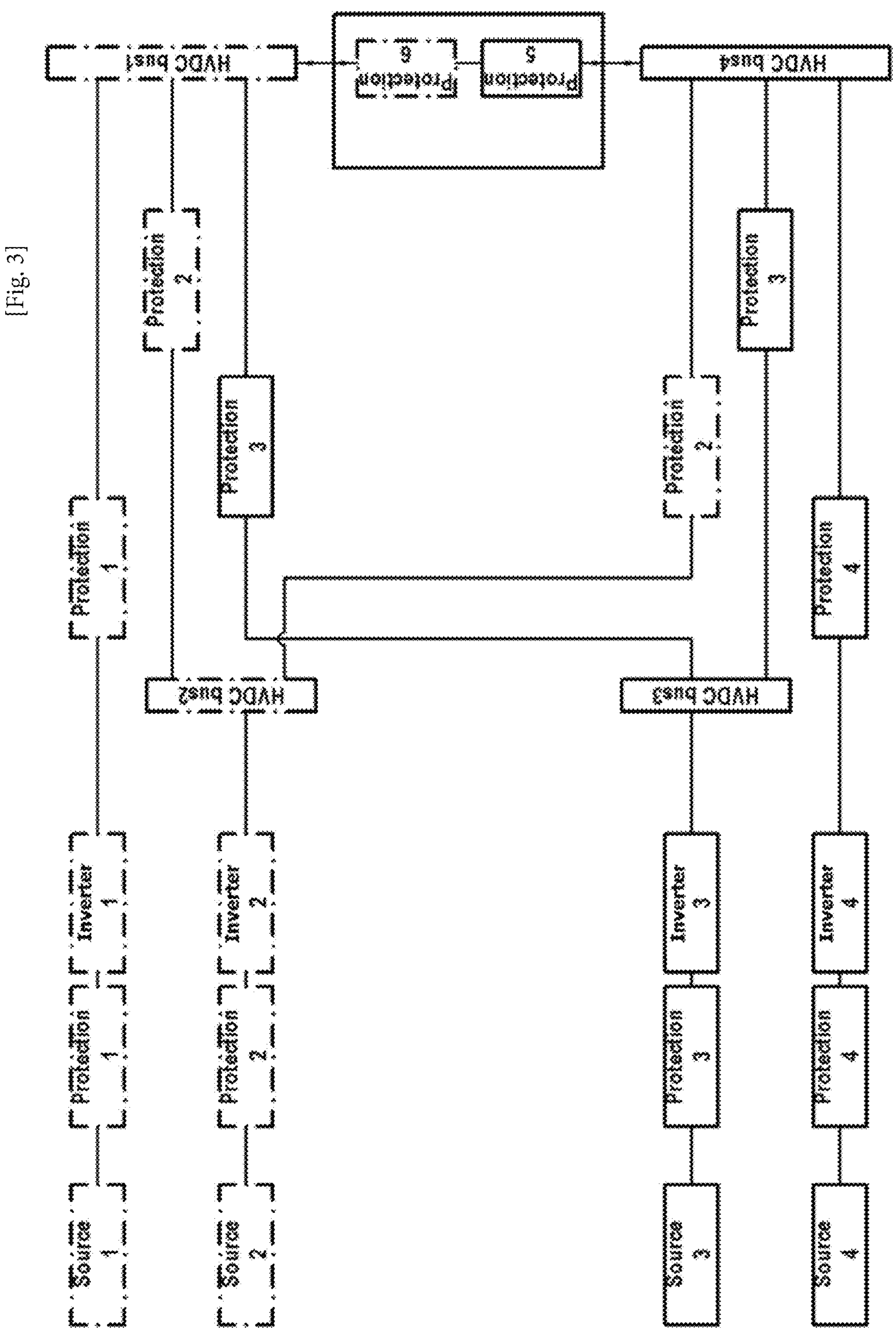

[Fig. 4]
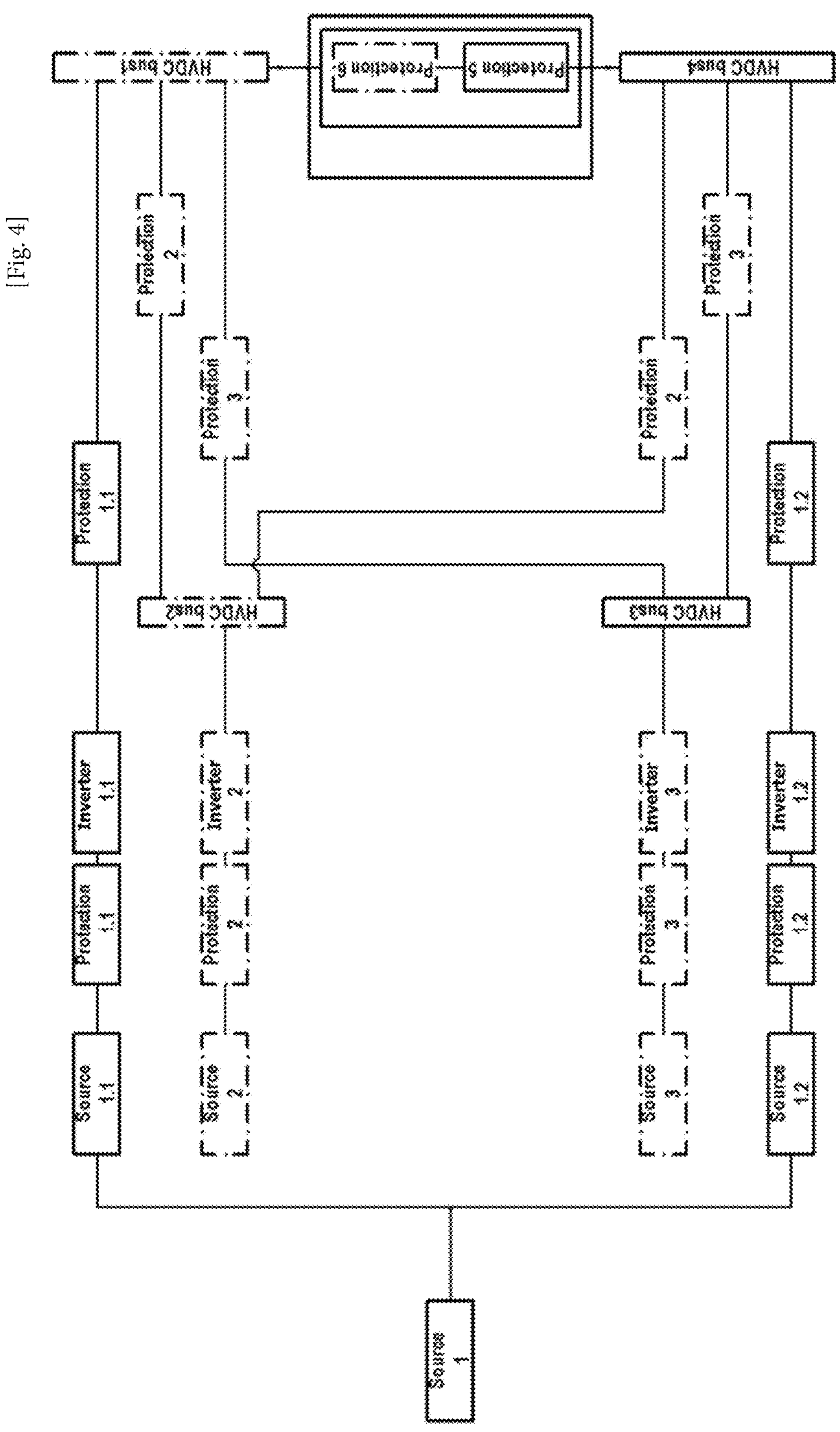

[Fig. 5]
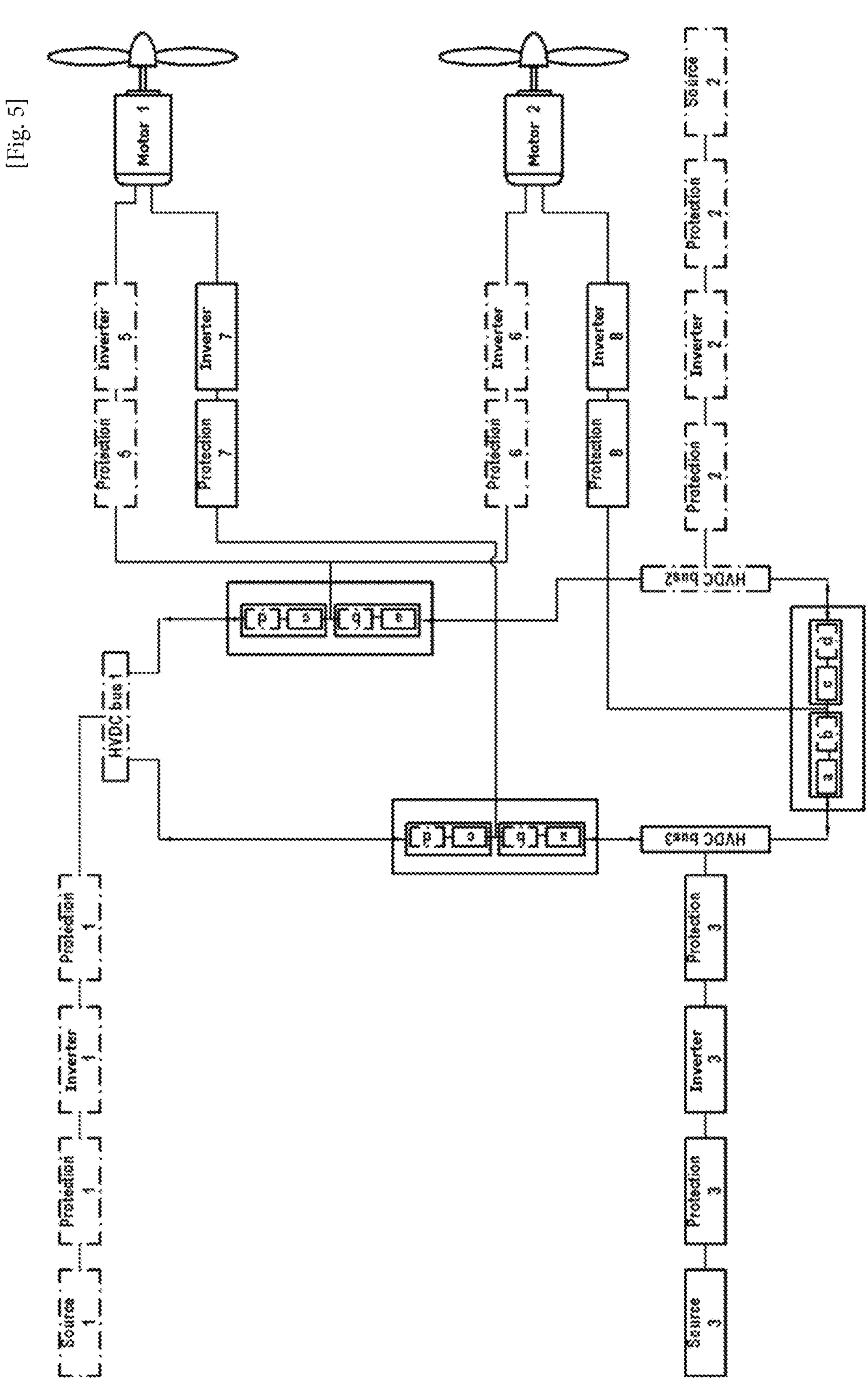

[Fig. 6]
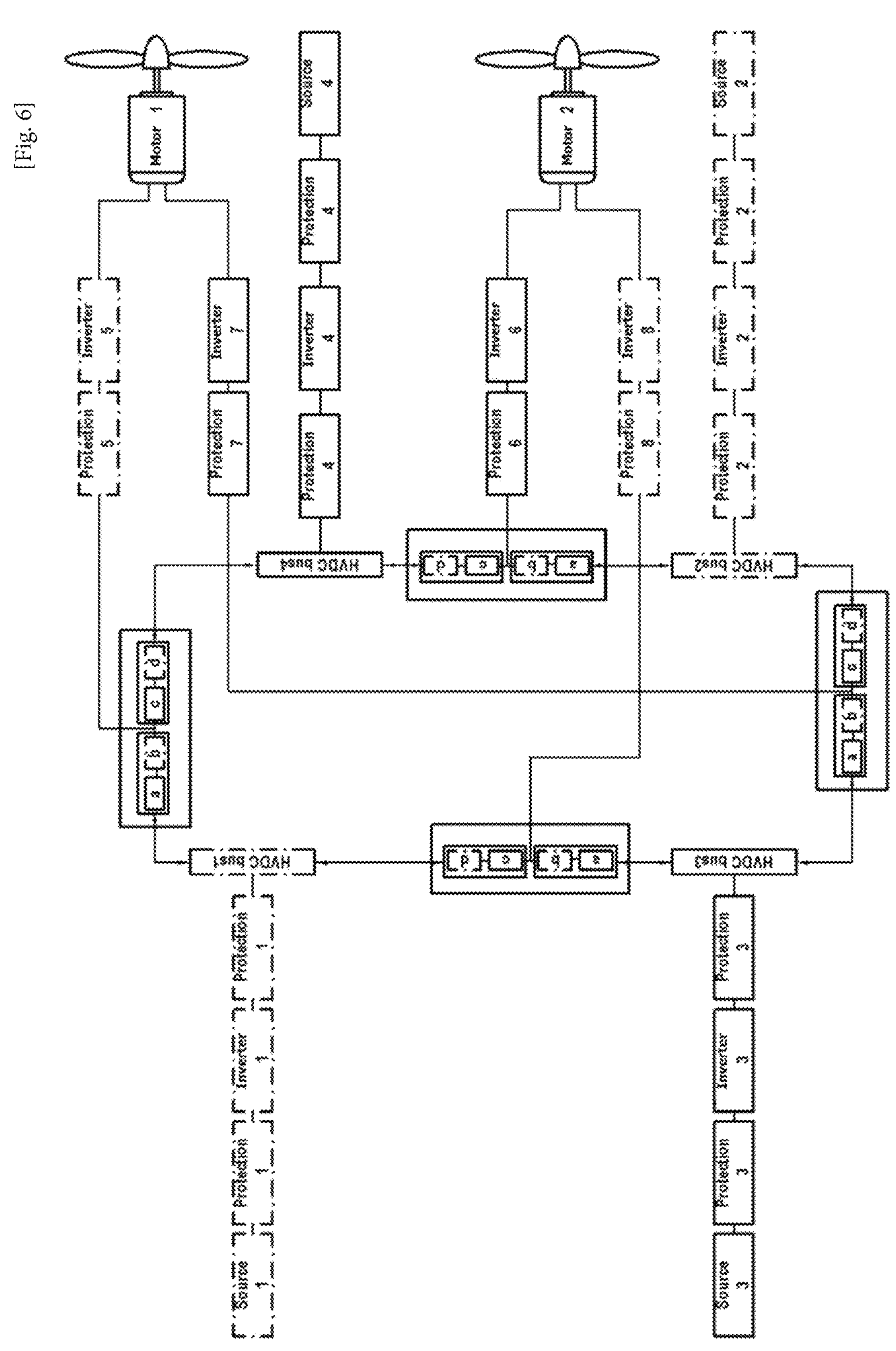

AIRCRAFT ELECTRIC OR HYBRID PROPULSION ARCHITECTURE

CROSS-REFERENCE TO RELATED APPLICATION

This is a National Stage Application under 35 U.S.C. § 371 of International Application No. PCT/FR2023/051990, filed Dec. 12, 2023, now published as WO 2024/126944 A1, which claims priority to French Patent Application No. 2213257, filed on Dec. 13, 2022, the entireties of which are incorporated herein by reference.

TECHNICAL FIELD

This invention relates to the field of aircraft electric or hybrid propulsion architectures. It more specifically relates to a propulsion architecture which is tolerant to random failures and robust to systemic failures.

PRIOR ART

Architectures of propulsion systems of fixed- or rotary-wing aircraft are generally tolerant to single random failures but are not tolerant to systemic failures, particularly for certain critical events of a kind that causes the loss of the aircraft (by loss of integrity of the control of the propulsion system, or loss of the propulsion system itself). This is especially true for aircraft of VTOL (Vertical Take-Off and Landing) types used for urban mobility purposes, the propulsion function of which directly contributes to the lift function, and for which the expected level of safety to avoid tragic losses and human catastrophes is then even more important than that required of conventional aircraft which are less likely to crash in urban areas.

To be independent of loss of integrity of control, it is known practice to make control devices redundant so that after the validation of the first random failure, the control function remains ensured by redundancy. To be independent of the loss of the propulsion system, it is known practice to keep a minimum of propulsion resources operational to be able to perform a safety landing, i.e. making it possible to ensure a trajectory of the aircraft with the requisite safety margins.

These solutions, acceptable for conventional aircraft with heat engines, are no longer acceptable for the architectures of electric or hybrid propulsion lines which must offer better performance as regards random and systemic failures.

Moreover, climate change is a major concern for many legislative and regulatory bodies throughout the world. Specifically, various restrictions on carbon emissions have been, are being or will be adopted by various states. In particular, an ambitious standard is applicable both to new types of airplanes but also those currently in circulation, requiring the implementation of technological solutions to render them compliant with the regulations in effect. For several years now, civil aviation has been committed to making a contribution to the combat against climate change.

Technological research efforts have already made it possible to very significantly improve the environmental performance of airplanes. The Applicant is taking into consideration the factors affecting all design and development phases to obtain aeronautical components and products that are less energy-hungry, more respectful of the environment and whose integration and use in civil aviation has moderate environmental impacts, with the aim of improving the energy efficiency of the airplanes.

As a consequence, the Applicant is constantly working on the reduction of its climate impact by the use of methods and the exploitation of development and manufacturing processes which are virtuous and keep greenhouse gas emissions to an absolute minimum to reduce the environmental footprint of its business activity.

This sustained research and development work simultaneously concerns the new generations of airplane engines, the lightening of craft, particularly via the materials used and lighter onboard equipment, the development of the use of electrical technologies to provide propulsion, and, as indispensable companions of technological progress, aeronautical biofuels.

This invention is thus the result of this technological research aiming to very significantly improve the performance of airplanes and contribute to the reduction of their environmental impact.

SUMMARY OF THE INVENTION

With regard to the above, the main aim of this invention is to provide an electric or hybrid propulsion and/or lift architecture comprising at least two propulsion lines and which, in normal mode and in single or multiple fault states, offers the most margin in terms of power and probability of non-loss of the propulsion function.

These aims have been achieved by an aircraft electric or hybrid propulsion architecture including at least two propulsion lines, each propulsion line including at least one electric motor supplied from at least two energy sources of the propulsion architecture through at least two energy supply paths, each energy supply path including at least one energy inverter and one electrical protection delivering a DC voltage for a HVDC bus, each HVDC bus distributing this DC voltage to at least one electric motor through at least one of said energy inverters and one of said electrical protections, the propulsion architecture being characterized in that the energy supply paths are at least partially dissimilar, and preferably completely dissimilar.

Thus, by this dissimilarity of the energy supply paths, an architecture is obtained which is tolerant to random failures and robust to systemic failures. A propulsion system can thus be obtained which may be eligible for the rank of critical system, delivering the powers needed for flight control with a very high level of safety and minimizing vulnerabilities and threats of potential failures to an acceptable level.

In the invention, diversification or dissimilarity is therefore present in all the elements of the propulsion architecture, and makes it possible to maintain independence between potentially hazardous faults.

Preferably, the energy source, the electrical protection and the HVDC bus of one energy supply path are each dissimilar, respectively, from the energy source, from the energy inverter, from the electrical protection and from the HVDC bus of at least one other energy supply path.

Advantageously, the electric motors of the at least two propulsion lines are dissimilar.

The architecture can further include an electrical bus protection set up between two dissimilar HVDC buses.

Preferably, the electrical bus protection comprises a series assembly of a controlled elementary electrical protection, preferably comprising a contactor, and a non-controlled elementary electrical protection, preferably comprising a circuit breaker.

Applied to a ring energy distribution network with three HVDC buses, the architecture includes at least one HVDC bus partially or completely dissimilar from the two others.

Applied to a ring energy distribution network with four HVDC buses, the architecture includes at least one HVDC bus partially or completely dissimilar from the three others.

Preferably, two adjacent HVDC buses of the energy distribution network are connected to one another by a series assembly of two electrical bus protections, these two electrical bus protections comprising two dissimilar elementary electrical protections, preferably one controlled elementary electrical protection and one non-controlled elementary electrical protection.

The invention also relates to an electric or hybrid aircraft including an electric or hybrid propulsion architecture as mentioned above.

BRIEF DESCRIPTION OF THE DRAWINGS

Other features and advantages of this invention will become apparent from the description given below, with reference to the appended drawings which illustrate exemplary embodiments thereof without any limitation, among which:

FIG. 1 illustrates a first example of a propulsion architecture in accordance with the invention, FIG. 2 illustrates a second example of a propulsion architecture in accordance with the invention, FIG. 3 shows a first example of a power distribution network applicable to one or the other of the architectures of FIGS. 1 and 2, FIG. 4 shows a second example of a power distribution network applicable to one or the other of the architectures of FIGS. 1 and 2, FIG. 5 illustrates a third example of a propulsion architecture in accordance with the invention, and FIG. 6 illustrates a fourth example of a propulsion architecture in accordance with the invention.

DESCRIPTION OF THE EMBODIMENTS

In the remainder of the description, it is considered that all the elements of the architecture are in active operation and are able to contribute to compensating for systemic failures, as well as random failures, so as to maintain the fitness of the aircraft to make a safe landing with an electric motor (a single propulsion unit), i.e. to supply a level of emergency power needed to compensate for the loss or losses of the other propulsion units.

To make it possible for each motor (or group of motors, referred to as Group1 and Group2 in the remainder of the description) to operate independently of one another if there are two of them (or of all the others if there are more than two of them), the power-consuming items that are these electric motors should be made independent and the energy sources that supply them should also be independent.

It is recalled that the term "propulsion system" refers to the function and members that make it possible to produce and regulate the rotation speed and/or torque on each drive shaft of each electric motor. This production of power on multiple output shafts is slaved to the demands made by the flight control system of the aircraft.

Several propulsion system architectures will be described hereinafter and for each of them there will be an explanation of how this independence is ensured, to be tolerant to random single or systemic faults. This will be achieved via the use of diversification (or dissimilarity) which consists in providing as much difference as possible between the hardware or software characteristics of the subjects that one wishes to make independent, such that, the more different characteristics there are between the same objects, the lower the probability of failures of these objects due to a common cause.

In the remainder of the description, elements or supply paths of the propulsion architecture are known as "dissimilar" when they meet this diversification criterion, particularly when their hardware or software characteristics are different.

Specifically, the fact that objects are very similar or even identical creates a dependence between these objects, i.e. they are no longer statistically independent and the failure of one of these objects is statistically correlated with the failure of another of these objects. This dependency can be due to intrinsic functional or physical characteristics, deliberate or otherwise, which are vulnerabilities such as for example: the behavior, material, geometry etc., or else intrinsic or extrinsic characteristics of the objects, deliberate or otherwise, which are the result of interactions between the objects, or else of a behavior in response to a given situation.

It may be considered that there are two subsets of causes that make failures dependent. The first subset relates to cascade failures which are failures where there is a physical or logical coupling between non-redundant objects. There is firstly a primary failure of the first object, then by propagation, the secondary failure of the second object etc., until the cessation of the propagation at the final element which fails, or else the cessation of the propagation at an object more robust than its predecessor to failure. The second subset relates to common cause failures which can reveal the dependency of several objects in a same time interval, such as a flight or a mission, and which may be the result of a mechanism of coupling of redundant objects, or of a common cause initiator, at a certain moment in time (e.g. a morning with more humidity than usual, a higher level of vibration than usual etc.) The common cause can appear to be random in nature due to the fact that the initiator can appear randomly over time to create the conditions of occurrence of the failures of several objects in the flight. However, when there is an occurrence of the initiator (stress, particular demand), the effects of the failures are the same due to the lack of robustness of the objects with regard to the equivalent conditions that generate the failure of each of the objects.

The invention therefore describes architectures tolerant to common causes leading to potentially critical systemic failures of the propulsion system, and which by reducing common initiators and coupling mechanisms avoid these common causes leading to much-feared events of the propulsion system (the loss of integrity and loss of availability described in the introduction).

FIG. 1 shows a first example of a propulsion system architecture in accordance with the invention composed of at least two propulsion lines, in each of which there is at least: an energy source, a first element for inverting energy, an element for distributing the inverted energy, a second element for inverting the distributed energy, an element for transforming the electrical energy into mechanical energy (electric motors) which drives a propeller, electrical protections and one or more control systems (not illustrated) of the different elements of the line.

This is a propulsion architecture with two independent propulsion groups (Group1 #Group2) (the sign #signifying this independence), the motor of Group1 not having the same origin (for example different suppliers) as that of Group2 (these two motors are therefore dissimilar), organized with two HVDC (High Voltage Direct Current) buses which are also independent: HVDC bus1 #HVDC bus2. For such a bus, which technologically is a simple copper/aluminum bar, this independence will manifest as characteristics that make it possible to guard against common causes with distinct materials, forms or suppliers.

To improve the availability of each HVDC bus, each HVDC bus is advantageously supplied along more than one functional supply line (or energy supply path) by several sources, two in this first configuration, one source of which is common to two functional supply lines. The common source 2 can be, for example, a non-rechargeable thermal battery, or else a rechargeable element such as a fuel cell, or a supercapacitor as illustrated or else a heat engine equipped with two alternators or a dual-channel (also known as dual-star) alternator supplying an HVAC bus (not shown), while source 1 and 3 could be batteries.

The fact of having more than one functional supply line makes it possible to be tolerant to causes of single random failure which cause the loss of the power supply to the bus and therefore the whole bus (in this scenario it is necessary for each functional line to be in a position to supply the maximum power required as a genuine redundancy) but cannot palliate systemic failures which exist due to similarity of definition/design, manufacturing, installation, use, and maintenance/repair, of these redundant functional supply lines.

Also, according to the invention, in order for this propulsion architecture to become tolerant to systemic failures and satisfy the aforementioned HVDC bus1 #HVDC bus2 independence condition, it is also necessary for these two supply lines to be at least partially dissimilar, and preferably completely dissimilar.

This dissimilarity is illustrated by the contours in solid lines or dotted lines of the units in question, the same contours corresponding to similar objects. Thus, the source 1 is similar to the source 3 and the source 2 is dissimilar from the sources 1 and 3. The same similarities and dissimilarities are present at the inverters and electrical protections of each propulsion line.

These electrical protections play a role of protection against certain electrical failures: short circuits between wires, between phases or between phases and the ground. These electrical protections are known by the names: fuse, pyrofuse, circuit breaker, pyrotechnic circuit breaker etc. With the exception of the fuse, these components are completely or partially controlled and depend on another element which will detect these short-circuit faults. In most cases, these electrical protections combine an element that provides the detection and another that controls an element for breaking the electrical fault. More generally, an electrical protection is the combination of two series switches combining a dual property: active component and passive component. Such an electrical protection serves to protect the propulsion line from the effects of the failure of an element of an electrical path, so as to locally contain the electrical failure and make it possible to keep the other paths and electrical elements in a state of nominal operation, and therefore to make them independent of the electrical failure and the affected path or paths.

Thus, for an electrical failure coming from a source which can be AC or DC, one will seek to isolate it from the power-consuming item(s). For an electrical failure coming from a distribution element (HVDC or HVAC busbar), one will seek to isolate it from the power-consuming item(s) as well as from the source to avoid the propagation to other electrical paths. For an electrical failure coming from an energy-transforming element (AC/DC inverter, DC/AC inverter, . . . ), one will seek to isolate it from the source, the distribution element and from the power-consuming item(s) downstream.

Any electrical failure of short-circuit type must be able to be contained by isolating the other elements of the electrical circuit from the effects of this failure. Thus, each electrical protection must be independent of the causes it is intended to cover, i.e. any cause of failure leading to a short circuit must be independent of the electrical protection against short circuits.

Note that these electrical protections are also able to palliate, in the same way, risks other than short-circuit risks, such as overvoltage, overtemperature or thermal runaway of electrical origin (battery) which must also be controlled in an electric or hybrid propulsion system.

Between the two HVDC buses (HVDC bus 1, HVDC bus 2) an electrical bus protection of "crossbar contactor" type is set up. This electrical bus protection consists in the series assembly of two types of elementary electrical protection: one controlled, such as a contactor (controlled to open for example as a function of an overcurrent), and the other non-controlled, such as a circuit breaker, a pyrofuse, or a pyroswitch. These two protections are dissimilar by nature, each of them opening under very specific conditions, redundant or complementary to one another.

According to requirements, this electrical bus protection can be installed or not. If it is installed, the contactor is generally kept open, except in the event of a fault, and the circuit breaker is generally kept closed in the nominal position (the crossbar contactor must be open in the nominal scenario to maintain the independence of the two channels). The contactor (the controlled element) of the electrical protection can be caused to close, in very specific phases of operation on the ground or in flight, to recharge one source with another for example, or in the event of a failure. During certain failures, rather than using the non-failed supply paths to the maximum of their performance, it can be particularly advantageous to restore other paths and distribute the power over a certain number of paths, which is doubly advantageous since it avoids making certain paths operate at maximum power, which reduces the risk of faults and thus makes it possible to keep certain paths redundant and therefore to maintain the system in a state that is more tolerant of faults.

From a safety point of view, the dependence between the two HVDC buses is only acceptable if one knows how to isolate one HVDC bus from another again when one of the buses fails. The embodiment can lead to the implementing of several electrical elements so as to be sure to be able to make the two buses independent again, by opening the dependence connection, if one of the two buses was, for example, short-circuiting.

It should be specified that there are several possible combinations of sharing, according to whether the power supply of the bus is simplex, duplex, or more. It can for example be envisioned in a variant architecture for the HDVC bus 1 to be supplied in simplex solely by the source 2, i.e. without the source 1 which would then not be installed. In this case, there would thus be only two true energy sources, the source 2 and the source 3, i.e. a second-order minimal cutset for the loss of availability of the sources, but with an appreciable saving on the mass balance in relation to the third-order minimal cutset relating to the loss of availability of the sources with the architecture of FIG. 1. The concept of n-th order minimal cutset must be understood to mean the number n of necessary conditions to arrive at the loss of the aircraft within the meaning of the fault tree associated with the propulsion lines.

To optimally preserve the HVDC bus1 #HVDC bus2 independence principle between the two buses, it should be specified that at least one supply path of the HDVC bus 1 is dissimilar from at least one supply path of the HVDC bus 2, which can be represented as follows:

[path1 or path2.1] #[path2.2 or path3].

Or else for example:

[Source1+Protection1+Inverter1+HVDC Bus 1] #[Source3+Protection3+Inverter3+HVDC Bus2], [Source2 #[HVDC bus1 or HVDC bus2]], which allows: Source2.1=Source2.2, Protection2.1=Protection2.2=[Protection1 or Protection3 or neither], Inverter2.1=Inverter2.2=[Inverter1 or Inverter3 or neither],

[Source2.1+Protection2.1+Inverter2.1+HVDC Bus 1] #[Source2.2+Protection2.2+Inverter2.2+HVDC Bus2], [Source2 #[HVDC bus1 or HVDC bus2]], Source2 #[Source1 or Source3], which allows: Protection1=Protection3=[Protection2.1 or Protection2.2 or neither], Inverter1=Inverter3=[Inverter2.1 or Inverter2.2 or neither],

[Source1+Protection1+Inverter1+HVDC Bus 1] #[Source2+Source2.2+Protection2.2+Inverter2.2+HVDC Bus2], [Source2 #[HVDC bus1 or HVDC bus2]], which allows: Source1=Source3, Protection1=Protection3=[Protection2.1 or not], Inverter1=Inverter3=[Inverter2.1 or not],

[Source1+Protection1+Inverter1+HVDC Bus 1] #[Source2+Source2.*i*+Protection2.*i*+Inverter2.*i*+HVDC Bus2], [Source2 #[HVDC bus1 or HVDC bus2]], which allows: Source1=Source3, Protection1=Protection3, Inverter1=Inverter3, Of course, it is fundamental that the path 2.1 be electrically independent of the path 2.2 and that the fault of the common point "Source 2" does not propagate, leading to the loss of HVDC bus1 and HVDC bus2. To achieve this, it is thus necessary for: Source 2 #[HVDC bus1 or HVDC bus2].

This independency is found in the electric motors which are dissimilar from one another and also have distinct routing. Thus, the motor1 is supplied both from the HVDC bus1 and the HVDC bus2 through dissimilar inverters and electrical protections. More precisely, the motor1 is supplied from the HVDC bus1 by a path 1.1 through the electrical protection 1 and through the inverter 1.1 and from the HVDC bus2 by a path 2.1 through the electrical protection 2 and through the inverter 2.1, it being understood that the protection 1 and the protection 2 are dissimilar and the inverter 1.1 and the inverter 2.1 are also dissimilar. Similarly, the motor2 is supplied from the HVDC bus1 by a path 2.2 through the electrical protection 1 and through the inverter 1.2 and from the HVDC bus2 by a path 2.1 through the electrical protection 2 and through the inverter 2.1, it being understood that the protection 1 and the protection 2 are dissimilar and the inverter 2.1 and the inverter 2.2 are also dissimilar.

In FIG. 2, the sources 2.1 and 2.2 no longer have a common origin and are therefore distinct, and the routing of the loads is different. Thus, the motor1 is supplied exclusively from the HVDC bus 1 by two redundant paths, one 1.1 through the electrical protection 1 and through the inverter 1.1 and the other 1.2 through the protection 1 and through the inverter 1.2, and the motor2 from the HVDC bus2 also by two redundant paths, one 2.1 through the protection 2 and through the inverter 2.1 and the other 2.2 through the protection 2 and through the inverter 2.2.

FIG. 3 shows a different example of supplying of the HVDC bus1 and HVDC bus2 with four distinct sources (the load routing is absent). This architecture is substantially different from the preceding one, in the sense that there are two sources which are shared on each HVDC bus. But there are also two additional HVDC buses. This advantageously makes it possible to route the loads as illustrated previously in FIGS. 1 and 2 so as to eliminate the second-order failure minimal cutset which exists when there are only two buses.

To optimally preserve the independence principle between the two buses: HVDC bus1 #HVDC bus4, it should be specified that at least one supply path of the HVDC bus 1 be partially or completely dissimilar from at least one supply path of the HVDC bus 4, which takes the following form:

[path1 or path2] #[path3 or path4].

So for example, between several possible distributions of the dissimilarity across this architecture, at least the following minimum choice:

[Source1+Protection1+Inverter1+HVDC Bus 1] #[Source4+Protection4+Inverter4+HVDC Bus4], [Source2 #[HVDC bus1 or HVDC bus4]], [Source3 #[HVDC bus1 or HVDC bus4]], which allows: Source1=Source2, Protection1=Protection2, HVDC bus1=HVDC bus2, Inverter1=Inverter2, Source3=Source4, Protection3=Protection4, Inverter3=Inverter4, HVDC bus3=HVDC bus4.

Another example of equally appropriate distribution takes advantage of the dissimilarity which, according to the scenario, may exist between the sources 2 and 3 based on batteries and the sources 1 and 4 which could be different to batteries.

The purpose of adding, in these two preceding configurations, an electrical bus protection (Protection 5 and Protection 6) between the buses HVDC1 and HVDC4 remains the same for the first configuration. The crossbar contactor can serve as redundancy for the buses HVDC2 and HVDC3 to make it possible to connect the bus HVDC1 to the bus HVDC 4.

The architecture of FIG. 4 replicates the principles above but makes it possible to reduce the number of available sources. In this configuration, the loss of the sources is a third-order minimal cutset. If the requirements and reliability/availability of the sources allow it, one could reduce the number of sources still further, for example by removing Source2 or Source3. In this case, the loss of the sources would be a second-order minimal cutset, which is not prohibitive in itself.

Here again, to optimally preserve the independence principle between the two buses (HVDC bus1 #HVDC bus4), it should be specified that at least one supply path of the HVDC bus1 be partially or completely dissimilar from at least one supply path of the HVDC bus4, which takes the following form:

[path1.1 or path2 or path3] #[path1.2 or path3 or path2].

There are several possible distributions of the dissimilarity across this architecture including the following, which minimizes the number of dissimilar elements:

[Source 1+Source1.*i*+Protection1.*i*+Inverter1.*i*+HVDC Bus 1] #[Source2/3+Protection2/3+Inverter2/3+HVDC Bus4], [Source2 #[HVDC bus1 or HVDC bus4]], [Source3 #[HVDC bus1 or HVDC bus4]], which allows: Source2=Source3, Protection2=Protection3, HVDC bus1=HVDC bus2, Inverter2=Inverter3, Source1.1=Source1.2, Protection1.1=Protection1.2, Inverter1.1=Inverter1.2, HVDC bus3=HVDC bus4.

Of course, it is fundamental that the path 1.1 is electrically independent from the path 1.2 and that the fault of the common point of the common source does not propagate to avoid leading to the loss of both HVDC bus1 and HVDC bus4. To do this, it is thus necessary for: Source 1 #[HVDC bus1 or HVDC bus4].

As previously, the benefit of adding an electrical bus protection between the buses HVDC1 and HVDC4 remains the same as for the preceding architectures. The crossbar contactor can serve as redundancy for the HVDC bus2 and for the HVDC bus3 to make it possible to connect the HVDC bus1 to the HVDC bus4.

The architecture illustrated on FIG. 5 shows a ring network with three distinct sources. In such a ring network architecture, the loads (the electric motors actuating the propellers) are not directly connected to the HVDC buses but through so-called Reconfiguration modules disposed at the intersection of two adjacent HVDC buses of the ring and constituted of two electrical bus protections. Each of these two electrical bus protections consists in the series assembly of two types of elementary electrical protection (Protection_a and Protection_b on the one hand and Protection_c and Protection_d on the other) which are dissimilar by nature: one controlled, such as a contactor, and the other non-controlled, such as a circuit breaker. These electrical bus protections are not necessarily all identical as illustrated and the dissimilarity of the modules as illustrated could be organized differently.

On such a ring network with three sources, there are three points of connection of the loads (at the junction point between the two electrical bus protections) whereas on a ring network with four sources as illustrated in FIG. 6, there are four connection points of the sources.

Whereas in all the previous configurations, there were several electrical networks (2, 3, 4, . . . ) which were electrically independent HVDC buses, the ring network is the example of an implementation in which all the sources and the loads are connected to the same network. Such a network is organically like a spider's web which offers significant advantages for tolerance to the faults of the different participants of the network.

To comply with the independence principle that guides the invention, the dysfunctional behavior of an object of the network, source, inverter, bus, or load should not compromise the operation of the other objects, whatever the fault scenarios, i.e. whether these objects are autonomous from the point of view of their operation. In other words, at least two families of supply paths must be independent (including systemic failures), i.e. there must always be at least two families of sources, inverters, buses, and loads which must be independent.

As two independent propulsion groups (Group1 #Group2) are desired, this entails there being at least one network independent of another, i.e. HVDC bus_i #HVDC bus_autres. Thus, if the need were to arise for a third-order independence on an architecture (Group1 #Group2 #Group3), there would have to be at least two distinct paths partially or completely dissimilar from one another and from the others, HVDC bus_i #HVDC bus_j #HVDC bus_autres. Similarly, if there were a need for an n-th order independence, there would have to be at least n−1 distinct paths partially or completely dissimilar from one another and from these latters.

In our ring network configuration with three buses, with a second-order independency requirement (Group1 #Group2), it is therefore advisable to have at least one bus partially or completely dissimilar from the two others, whereas on an architecture with four buses, there should be at least one bus partially or completely dissimilar from the three others. As in the preceding architectures, there are several ways of distributing the dissimilarity. In particular, when there is an even number of buses, as illustrated in FIG. 6, the equal distribution of the dissimilarity is a solution which from an industrial point of view offers advantages in terms of production volume, stocks, experience feedback, etc.

Note however that, as for all the examples of propulsion architecture described in this invention, there may be grounds for other distribution choices according for example to: the reliability of the diversified technological solutions, the aircraft and its capacity for the installation of routes that do not corrupt the expected independence by common causes of failure due to the areas of the aircraft traversed by the routes, or else other threats such as for example high-energy debris.

A few examples of dissimilarities will now be described for generators, inverters, motors and electrical protections. These examples are only an illustration and are not limiting of the invention.

For an energy-generating propulsion system, at least two different voltage generators can be put in parallel: one generator generates electricity using a rotary machine and the other generator generates electricity electrochemically.

For inverters present in the propulsion system, the dissimilarity can be hardware- or software-based. One may, for example, have a inverter with a digital control architecture while another inverter has an analog control architecture. This in particular makes it possible to reduce its vulnerability to cybersecurity attacks (introduction possible on the digital network, but not on the analog network), and to lightning strikes (the lightning can make the digital network, which is more sensitive to it, malfunction, and therefore the conversion function can be maintained using the analog control network).

Concerning the motors present in the propulsion system, different motor topologies can be used. For example, one motor can be a permanent-magnet synchronous machine and another can be an asynchronous machine. This in particular makes it possible to limit the problems related to the nature of the materials used for the magnets.

Finally, for protection systems, these can be remote-controlled or else be triggered autonomously. One can also use protections of electromechanical type (circuit breaker, fuse or pyrofuse) or of electronic type (Solid-State Power Controller or SSPC).

The invention claimed is:

1. An aircraft electric or hybrid propulsion architecture including at least two propulsion lines, each propulsion line including at least one electric motor supplied from at least two energy sources of the propulsion architecture through at least two energy supply paths, each energy supply path including at least one energy inverter, an energy source of the at least two energy sources and one electrical protection delivering a DC voltage for a HVDC bus, each HVDC bus distributing this DC voltage to the at least one electric motor through at least one additional energy inverter and at least one additional electrical protection, wherein a first energy source of the at least two energy sources, the at least one energy inverter, the at least one electrical protection and the HVDC bus of one of the at least two energy supply paths are each dissimilar in hardware or software, respectively, from a second energy source of the at least two energy sources, from the at least one energy inverter, from the at least one electrical protection and from the HVDC bus of at least one other of the at least two energy supply paths.

2. The architecture as claimed in claim 1, wherein each of the electric motors of the at least two propulsion lines are dissimilar.

3. The architecture as claimed in claim 1, further including an electrical bus protection set up between two dissimilar HVDC buses.

4. The architecture as claimed in claim 3, wherein the electrical bus protection comprises a series assembly of a controlled elementary electrical protection, and a non-controlled elementary electrical protection.

5. The architecture as claimed in claim 1, the architecture being configured to be applied to a ring energy distribution network with three HVDC buses, wherein at least one HVDC bus is partially or completely dissimilar from the two others.

6. The architecture as claimed in claim 1, the architecture being configured to be applied to a ring energy distribution network with four HVDC buses, wherein at least one HVDC bus is partially or completely dissimilar from the three others.

7. The architecture as claimed in claim 5, wherein two adjacent HVDC buses of the energy distribution network are connected to one another by a series assembly of two electrical bus protections.

8. The architecture as claimed in claim 7, wherein each of said two electrical bus protections comprises two dissimilar elementary electrical protections.

9. An electric or hybrid aircraft including an electric or hybrid propulsion architecture as claimed in claim 1.

10. The architecture as claimed in claim 4, wherein the controlled elementary electrical protection comprises a contactor.

11. The architecture as claimed in claim 4, wherein the non-controlled elementary electrical protection comprises a circuit breaker.

12. The architecture as claimed in claim 8, wherein one of the two dissimilar elementary electrical protection is a controlled elementary protection and the other one of two dissimilar elementary electrical protection is a non-controlled elementary protection.

13. The architecture as claimed in claim 1, wherein each energy supply path is configured to be electrically independent such that a fault occurring in one energy supply path is isolated without propagation to another energy supply path.

14. The architecture as claimed in claim 1, wherein the first energy source of the at least two energy sources comprises an electrochemical energy source and the second energy source of the at least two energy sources comprises a rotary electrical generator.

15. The architecture as claimed in claim 1, wherein the at least one energy inverter of one of the at least two energy supply paths comprises a digital control architecture and the at least one energy inverter of the at least one other of the at least two energy supply paths comprises an analog control architecture.

16. The architecture as claimed in claim 3, wherein the electrical bus protection is configured to isolate one HVDC bus from another HVDC bus in response to a fault occurring on one of the HVDC buses.

17. The architecture as claimed in claim 4, wherein the controlled elementary electrical protection is configured to open as a function of an overcurrent condition.

18. The architecture as claimed in claim 3, wherein the electrical bus protection is of a crossbar contactor type configured to selectively connect two HVDC buses.

19. The architecture as claimed in claim 4, wherein the electrical bus protection is configured such that, in a nominal operating state, the controlled elementary electrical protection is open and the non-controlled elementary electrical protection is closed.

20. The architecture as claimed in claim 19, wherein the controlled elementary electrical protection is configured to be closed during at least one of a ground operation phase, a flight operation phase, or a failure condition to enable power transfer between the two HVDC buses.

* * * * *